No. 732,871. PATENTED JULY 7, 1903.
H. LEMP.
RELIEF VALVE.
APPLICATION FILED MAY 9, 1901.
NO MODEL
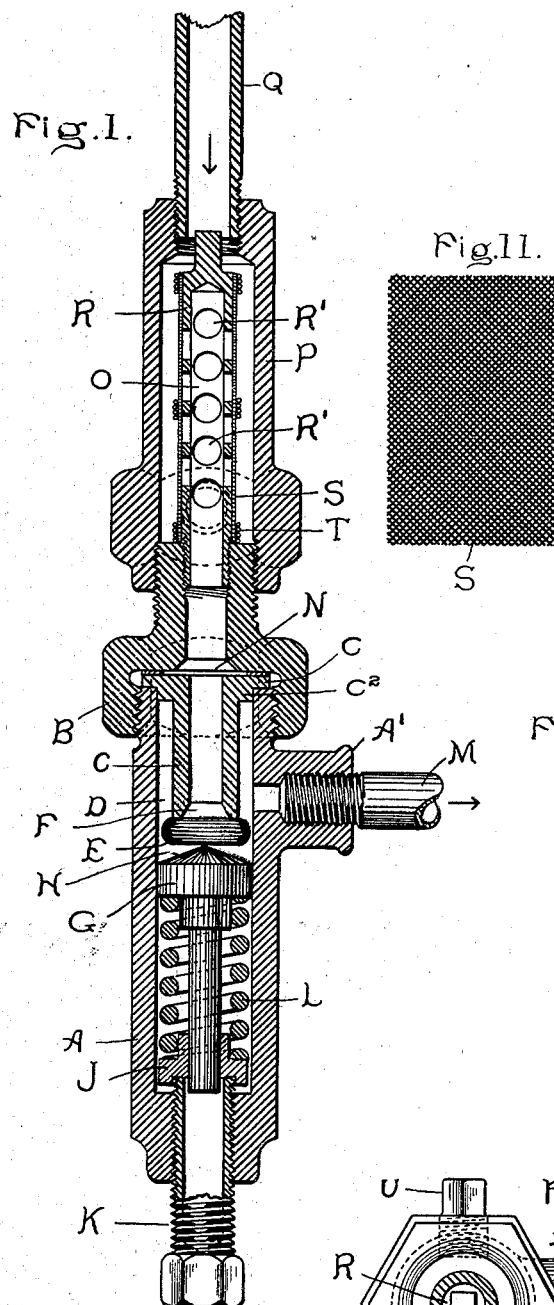
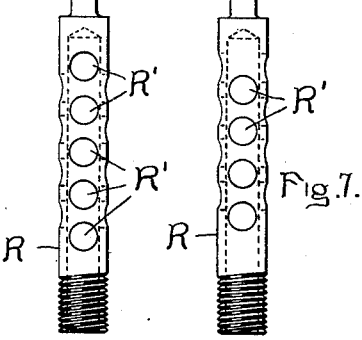
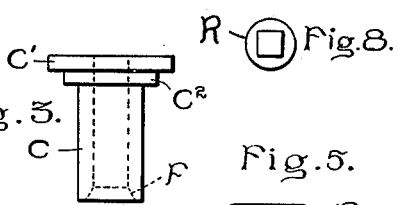
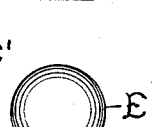
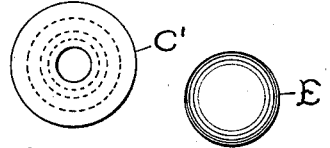
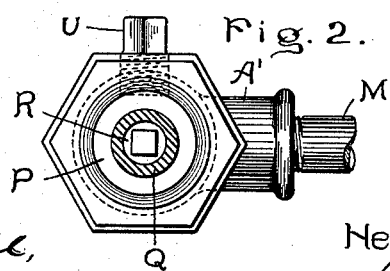
WITNESSES.
Benjamin B. Hall,
Alex F. Macdonald.
INVENTOR-
Hermann Lemp,
By Albert G. Davis
ATTY- No. 732,871. Patented July 7, 1903.

UNITED STATES PATENT OFFICE.

HERMANN LEMP, OF LYNN, MASSACHUSETTS.

RELIEF-VALVE.

SPECIFICATION forming part of Letters Patent No. 732,871, dated July 7, 1903.

Application filed May 9, 1901. Serial No. 59,382. (No model.)

*To all whom it may concern:*

Be it known that I, HERMANN LEMP, a citizen of the United States, residing at Lynn, county of Essex, State of Massachusetts, have invented certain new and useful Improvements in Relief-Valves, of which the following is a specification.

The present invention relates to what are commonly termed "relief-valves," and has for its object to provide a valve which will stand high pressures and which permits of regrinding of the seat and valve independent of each other.

In certain classes of work, notably for automobiles, where high pressures are used as high as from four hundred to five hundred pounds, I have found that the commercial valves are unsatisfactory. Where the valve-seats are made of relatively soft metal, the foreign matter, such as chips or scale which passes through the valve with the steam and water, is frequently caught between the valve and the seat and is pounded into the seat by the action of the spring or other equivalent valve-closing means. This means that a groove or depression will be formed and the valve will leak. It has been proposed to make valves with male and female parts made of hard metal; but all of the makes with which I am familiar require that the coöperating parts be ground together. These valves are guided by a projection on the male part, which enters the female part, and I have found that even when the coöperating parts are ground together that ridges are frequently formed on the seat, so that if the male part shifts slightly the valve will not close properly, and a leak will be the result. A still further objection lies in the form of guide—*i. e.*, the extension on the male part—and I have frequently found that where this guide is subjected to the high temperatures necessary for the class of work referred to it will get out of alinement with the head-like portion of the male part and cause the same to stick.

I overcome the objections above referred to by making the male and female parts out of hard steel or some similar material in a manner hereinafter described. A metal containing a certain percentage of nickel is very good, as it will not rust. The male part consists of a loose piece, usually in the form of a disk, having rounded edges and flat faces. This disk is arranged to be forced against the end of a tubular valve-seat by a spring-pressed plunger or its equivalent device, the plunger being arranged to bear on the disk at one point only—namely, the center. By this arrangement the disk can adjust itself to the seat and the pressure is uniform at all points, and since the disk and valve-seat both have plain flat surfaces they can be ground entirely independent of each other.

In the accompanying drawings is illustrated an embodiment of my invention, wherein—

Figure 1 is a vertical section of a valve. Fig. 2 is a plan view thereof. Figs. 3 and 4 are respectively a side elevation and plan of the valve-seat. Figs. 5 and 6 are respectively a side elevation and plan view of the valve. Figs. 7 and 8 are respectively a side elevation and top plan view of the sleeve which supports the filter. Figs. 9 and 10 are respectively a bottom plan view and side elevation of the sleeve, taken in a plane at right angles to that of Figs. 7 and 8; and Fig. 11 is a detail view of the screen or wire-gauze used on the filter.

Referring to Fig. 1, A represents the valve-casing, the upper end of which is faced off true and is provided with a screw-thread for engaging with the union B. The seat or female member of the valve is detachable and consists of a hardened-metal tubular piece C, having a shoulder $C'$, which rests on top of the casing A, and a second shoulder $C^2$, which serves to center the valve-seat and prevent it from being displaced laterally. The tubular portion extends into the casing and is separated therefrom by a space D. This gives an opening for the fluid and at the same time furnishes the requisite amount of space for the disk or male member of the valve. The inner end of the valve-seat where it engages with the disk E is cut away somewhat, as at F, so as to limit the area of the metal presented.

The valve E consists of a hardened-metal disk having flat surfaces at the top and bottom. The edge of the disk is rounded and is arranged to make a loose fit within the casing A, so that it will always seat, whether the seat is perfectly true or is inclined at a slight angle. The latter would only happen through poor workmanship or a defective piece of stock. The top and bottom surfaces of the disk are ground perfectly true, which is a simple piece of machine-work. The surfaces of the valve-seat and valve being hard, a piece of foreign matter being caught between them can make no indentation, and the opening and closing of the valve will dislodge it. It is preferable to make the disk a little harder than the seat, so that if through long usage there should be a slight tendency to form ridges it would have no effect on the hard disk, but would simply bur over the end of the tubular seat. The disk is held in place against the valve-seat by means of a spring-pressed plunger G. The head of the plunger is enlarged, so as to form a guide, and is also provided with a conical extension H, which engages with the center of one end of the disk and forces it against the seat. The point engaging with the center of the disk insures that the disk will bear evenly on the valve-seat. This arrangement will compensate for any wearing of the seat, even though the wear causes said seat to make other than a right angle with a plane passing through the vertical center. It is of course evident that the surface of the disk next to the plunger can be made conical, while the end of the plunger is made flat. With this arrangement the feature of forcing the disk against the seat from a central point only is still preserved. The plunger is pressed upward by the compression-spring L, which spring is seated on a collar J, the latter having a central bore to receive the rod of the plunger and is arranged to engage with the adjusting-screw K, the latter being mounted in the bottom of the valve-casing. On the side of the casing is formed a boss A', and screw-threaded thereto is an outlet-pipe M.

Screwed to the upper end of the casing is a union B, and between the union and the tubular seat is a washer N. It will be seen that the union in addition to holding the valve-seat in place supports the filter O and also acts as a connector between it and the pipe M. Surrounding the filter is a casing P, which is screw-threaded to the union, the upper end being screw-threaded to the pipe Q. The casing is provided with a screw-threaded plug U, and by removing the same the filter can be inspected and cleaned. The filter consists of a tube R, having a screw-thread at one end where it enters the coupling and a square head at the other, so that it may readily be mounted in place. The tube is perforated with a series of holes R', as shown in Figs. 7 and 10. The holes on one side are staggered with respect to those on the other, so as to get the greatest number of openings and still preserve the necessary strength. Around this tube is placed a fine-mesh screen S. This screen is held in place by bands of wire T.

The action of the valve is as follows: When the pressure in pipe Q rises to a point where it is greater than the pressure produced by the compression-spring L, the valve-disk E is moved away from its seat and the fluid passes from the valve into the outlet-pipe M. As soon as the pressure is decreased the valve is again seated by the spring. In order to adjust the valve to afford relief at any given pressure, the screw K is moved in or out.

At times these valves get very hot, due to the excessive steam-pressure, and in service no trouble has been experienced with them either when hot enough to cause the color of the metal to change or when cold. By making the parts so as to have an easy-working fit the changes in temperature can have no effect on the operation.

What I claim as new, and desire to secure by Letters Patent of the United States, is—

1. In a valve, the combination of a casing, a detachable piece having a valve-seat formed on one end, a valve having substantially parallel top and bottom hardened surfaces which engage with the valve-seat, a means bearing at a single point on one of the flat surfaces of the valve for holding it in place, at the same time permitting it to move laterally, and a guide formed on the casing for the valve.

2. In a relief-valve, the combination of a base having an opening therein, a tube having a hardened face which forms a seat, a retaining-clamp for the tube, a hard-steel disk having two corresponding flat surfaces so that it can be reversed, which disk is loose and forms the valve, and a spring-pressed plunger for forcing the valve against the seat.

3. In a valve, the combination of a casing having an opening therein, a detachable valve-seat mounted therein, consisting of a tube of less diameter than the opening and having a hardened seat and a shouldered portion which engages with the casing and prevents lateral movement, a spring-pressed plunger which applies pressure to the center of the disk, and means for adjusting the amount of such pressure.

4. In a relief-valve, the combination of a casing having an opening therein, a tubular seat mounted therein, which seat has a shoulder that centers it in the casing, a valve, a pipe, and a union which connects the casing and the pipe and also serves to hold the seat in place.

5. As an article of manufacture, a valve consisting of a disk of hardened metal having similar and parallel top and bottom ground surfaces and a rounded edge so that when one surface is worn, the disk may be reversed and the other surface used.

6. In a relief-valve, the combination of a casing, a valve-seat, a valve, a pipe, a filter, and a union which connects the casing and the pipe and also holds the valve-seat in place and forms a support for the filter.

7. In a relief-valve, the combination of a casing, a valve-seat, a valve, a coupling which holds the valve-seat in place, a filter comprising a perforated tube which is covered by a screen and is screw-threaded to the coupling, a pipe, and a casing which surrounds the filter and connects the pipe and the coupling.

8. In a relief-valve, the combination of a casing, a hardened valve-seat, a valve comprising a hardened disk having corresponding flat surfaces and a slightly-rounded edge, a plunger mounted within the casing and provided with an enlarged conical head, guides formed on the casing and arranged to engage with the head, a compression-spring for holding the plunger against the disk, and means for adjusting the spring.

9. In a relief-valve, the combination of a casing, a valve-seat comprising a tube which extends into the casing and is separated therefrom by a space at all points except at the supporting end, a loose hardened-metal disk arranged to engage with the seat, an outlet-pipe communicating with the space around the tubular seat at a point between the disk and the support for the seat, and means for holding the valve against its seat.

In witness whereof I have hereunto set my hand this 6th day of May, 1901.

HERMANN LEMP.

Witnesses:
ALEX. F. MACDONALD,
DUGALD McK. McKILLOP.